(12) United States Patent
Cabal

(10) Patent No.: US 6,648,353 B1
(45) Date of Patent: Nov. 18, 2003

(54) UPRIGHT STEP-CYCLE WITH ELLIPTICAL MOTION PEDALLING

(76) Inventor: Pedro Pablo Cabal, 1365 Blue Rd., Coral Gables, FL (US) 33146

( * ) Notice: Subject to any disclaimer, the term of this patent is extended or adjusted under 35 U.S.C. 154(b) by 0 days.

(21) Appl. No.: 10/185,914

(22) Filed: Jul. 1, 2002

(51) Int. Cl.⁷ .................................................. B62M 1/00
(52) U.S. Cl. ...................................... 280/221; 280/220
(58) Field of Search ............................... 280/221, 220, 280/252, 256, 259–261, 11.115; 482/51, 57

(56) References Cited

U.S. PATENT DOCUMENTS

| | | | |
|---|---|---|---|
| 1,190,089 A | * | 7/1916 | Bellairs |
| 4,043,552 A | * | 8/1977 | Kerkonian ................. 272/120 |
| 5,224,724 A | * | 7/1993 | Greenwood ................ 280/221 |
| 5,690,346 A | * | 11/1997 | Keskitalo .................. 280/234 |
| 6,146,313 A | * | 11/2000 | Whan-Tong et al. ......... 482/51 |
| 6,277,054 B1 | * | 8/2001 | Kuo .......................... 482/51 |
| 6,402,173 B1 | * | 6/2002 | Chiu .......................... 280/252 |
| 6,439,590 B1 | * | 8/2002 | Liang ......................... 280/221 |
| 6,551,217 B2 | * | 4/2003 | Kaganovsky ............... 482/51 |

\* cited by examiner

*Primary Examiner*—Lesley D. Morris
*Assistant Examiner*—Tony Winner

(57) ABSTRACT

An upright step cycle comprises a two wheeled bicycle, with two non-aligned foot support members (10) attached eccentrically to each crank arm (12) at one end, and at the other end, free to slide up and down along a straight guide track (16), producing an elliptical pedalling profile. A means by which to vary the guide track inclination angle, in order to produce a wide range of pedalling motion profiles. At lower inclination angles of the guide track, the stepping motion may resemble cross country skiing. At higher angles, the stepping motion may simulate walking, jogging, running or climbing. The guide track angle may be varied manually by the rider as the bicycle is in motion, therefore dismounting from the vehicle is not required. A system of gears (28 and 29) similar to those found on a standard bicycle, provide speed to power drive ratio adjustability to the driving wheel (21). A removable seat or leaning pad may also be included in the design. The upright step cycle uses standard bicycle parts thereby resulting in minimal re-tooling costs.

3 Claims, 6 Drawing Sheets

UPRIGHT STEP-CYCLE WITH ELLIPTICAL MOTION PEDALLING

BACKGROUND

1. Field of the Invention

The present invention relates to bicycle variations and, more particularly, pertains to an upright stepping bicycle with elliptical motion pedalling.

2. Description of the Prior Art

Over the years, various bicycle variations have been developed for recreational uses, and as a means of transportation and exercise. A common complaint among riders of these devices, has been the seating arrangement, which can be uncomfortable in cases of prolonged usage. Therefore, several innovations have been made in hopes of relieving the problem. For instance, the recumbent bicycle, in which the rider pedals the vehicle in a reclined position, has been proposed. One drawback of such a device, would be the fact that the rider is seated in a horizontally prone position, making the vehicle unstable and difficult to maneuver. This position may also pose blood flow and leg fatigue problems, which could cause cramping, and reduce the machines effectiveness as an exercising or commuting apparatus.

Accordingly, efforts have been made to remedy the inadequacies of the recumbent bicycle. For instance, some recumbent bicycles have recently been equipped with very comfortable molded seats, made of fiberglass, or similar materials. Additionally, the rider positions have been adjusted in certain models, to a more upright, rather than reclined position.

Although recumbent bicycles alleviate the uncomfortable seating arrangement of the standard bicycle, they pose several new problems. In the reclined position, it may be difficult to maintain equilibrium, due to the fact that the riders weight is not supported by the legs. Therefore, recumbent bicycles can be difficult to ride, and require significant agility, coordination, and balance to master. Also, these bicycles usually place the rider at a very low position relative to the ground, in order to make up for the instability of the design. This poses serious risks to the rider, in that they may not be visible to automobilists.

Another issue pertains to the physical aspects of propelling a bicycle. In the recumbent bicycle, the riders mass is wasted due to the reclined position, in which their entire body weight rests in the seat. To elaborate on this concept, consider riding a bicycle. In order to accelerate more effectively, a bicyclist will often stand up while riding, and pedal this way, rather than remaining seated. In standing, the rider uses their mass to increase the force applied to the pedals, rather than using strictly the leg muscles, as will occur when riding in a seated position. Pedal power and balance, will ultimately be sacrificed, when riding in the reclined position.

Although the aforementioned bicycles are very capable as exercise devices, and provide excellent pulmonary, cardiovascular, and muscular development benefits, it has been found that there is a need for a bicycle variation which would provide a more complete full-body-work-out, and still maintain the speed, comfort, maneuverability, and versatility of a standard bicycle. Therefore, the present invention intends to combine the freedom of a standard bicycle with the adjustability of an elliptical motion exercise device.

Several types of elliptical exercise machines have been proposed—for example, U.S. Pat. Nos. 5,935,046 (1998) Maresh, U.S. Pat. No. 5,499,956 (1996) Habing, U.S. Pat. No. 5,562,574 (1996) Miller, U.S. Pat. No. 5,518,473 (1995) Miller, U.S. Pat. No. 5,383,829 (1995) Miller, and U.S. Pat. No. 6,142,915 (1998) Eschenbach. These exercise machines all use an elliptical pedalling profile. The present invention intends to use the elliptical motion, as a means of propelling a two wheeled vehicle, similar to a bicycle. The rider will experience all the benefits of a standard bicycle, and furthermore, the ability to target a wider range of muscle groups.

SUMMARY OF THE INVENTION

It is therefore the aim of the present invention to provide the rider with all the agility and controllability of a standard bicycle.

It is also the aim of the present invention to provide a comfortable riding position, which is both efficient in pedaling and beneficial to the effectiveness of the machine as a low impact tool for exercising.

Therefore, to address these needs, the present invention proposes a bicycle in which the rider assumes an upright standing position and pedals the bicycle using an elliptical pedalling motion.

The bicycle comprises a set of horizontal foot support members, rotably attached to the revolving crank system by way of a set of bearings recessed within the foot support member, and fastened with a nut and washer to the crank axle. A wheel is mounted at the opposite end of each horizontal foot support member, allowing this portion of the components to slide up and down along inclined tracks as the bicycle is pedaled.

The device could alternately include a double-wheeled system rather than a single wheel to slide along the guide tracks. The second wheel would be incorporated to ensure that the foot support member does not become disengaged from the track, which may occur upon impacting a large bump or pothole. To provide a more streamlined foot support member to guide track connection, a sleeve and shaft slider mechanism could possibly be employed. This type of connection, comprises two solid rods in place of the guide tracks, and a corresponding sliding sleeve, which glides smoothly along each rod. The sliding sleeves could then be attached to each horizontal foot support member, thereby producing the elliptical pedalling profile. This motion is similar to walking, jogging, running, climbing, or cross-country skiing depending on the guide track angle setting.

The invention contemplates adjustability of the guide track inclination angle while the vehicle is in motion. This can be by way of simple mechanical means, or possibly by more complex hydraulic or electrical means. The mechanism would allow the rider to adjust the track angle and thereby the resistance and range of pedalling motion, without dismounting from the vehicle. Adjustability of the guide tracks would provide increased range of motion, and therefore, the possibility of targeting a wider array of muscular regions.

Variable gearing can be added without infringing upon the original intention of the invention. A standard bicycle is generally equipped with a system of gears which allow the rider to vary the amount of revolutions of the rear tire per revolutions of the pedals, thereby resulting in increased pedalling resistance with increasing land speed. Similar gearing would produce the same effect on the power to speed ratio of the present invention.

The scope of this invention should in no way be limited to what has been described so far. This includes the possibility of incorporating a seat, or some kind of resting element, into the design. The seating could be of a tubular style, commonly known as a banana seat, or, could possibly be a bumper-like pad against which the rider may recline. It may also be easily adjustable and removable, to allow for different rider heights and positioning preferences, and to provide the option of removing the seat completely.

One benefit of the present invention, is that the rider uses their body mass to propel the vehicle. Consequently, a greater force is applied to each pedal per stroke of the crank. Due to this trait, the standing bicycle is capable of traversing long distances at a fast rate, while using minimal effort.

Yet another benefit of the upright bicycle, is that a more complete and beneficial workout may be achieved, since the rider is supporting his or her own body weight. The upright positioning allows blood to flow freely throughout the entire body, rather than restrictively as will occur in the seated variety of bicycles.

Other objects and benefits of the invention will become apparent upon consideration of the following written description together with the accompanying figures.

BRIEF DESCRIPTION OF THE DRAWINGS

Having thus generally described the nature of the invention, reference will now be made to the accompanying drawings, showing by way of illustration a preferred embodiment thereof, and in which.

DRAWING REFERENCE NUMBER LIST

Figure 1:
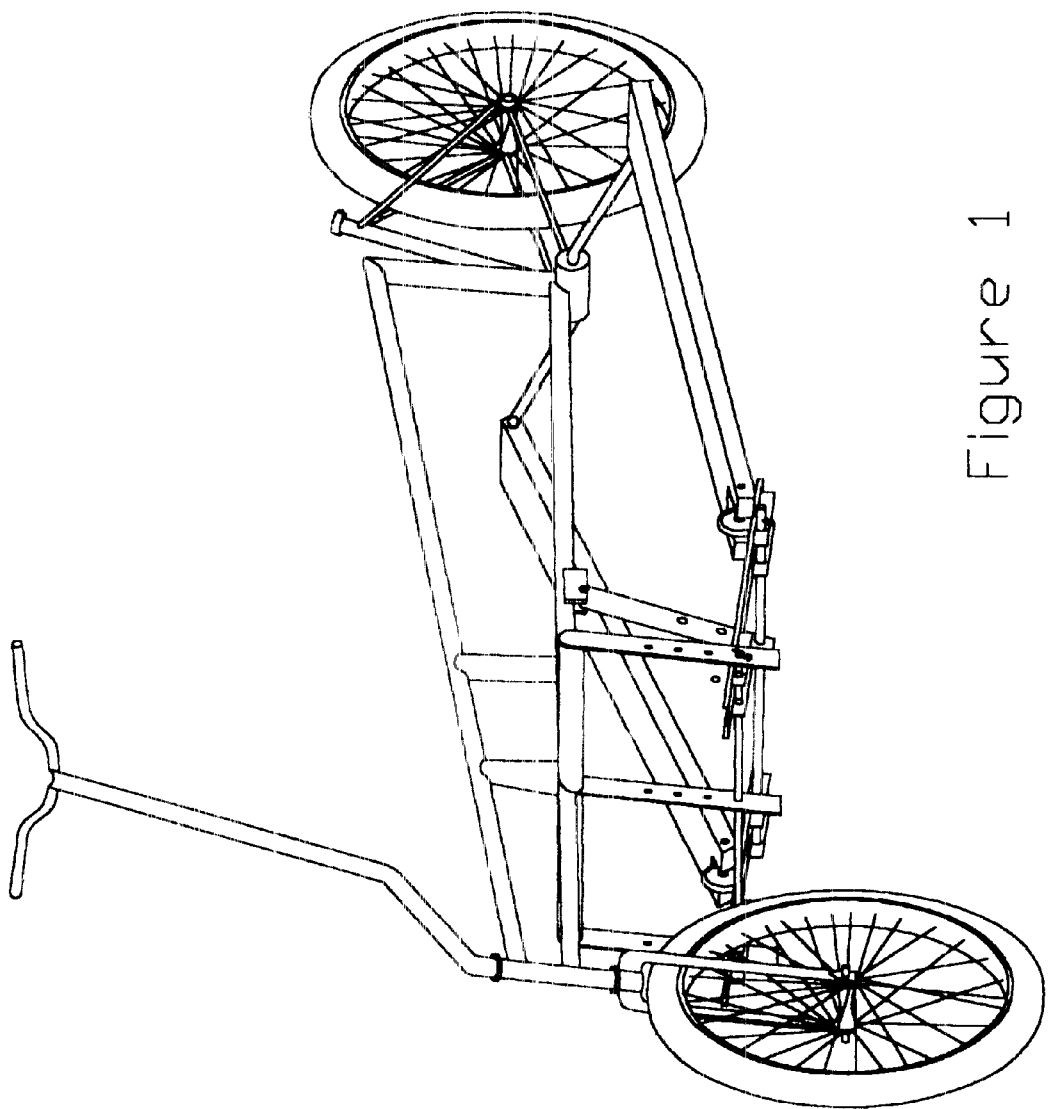
FIG. 1 is a top perspective view of a standing bicycle with elliptical motion pedaling in accordance with one embodiment of the present invention.
Figure 2:
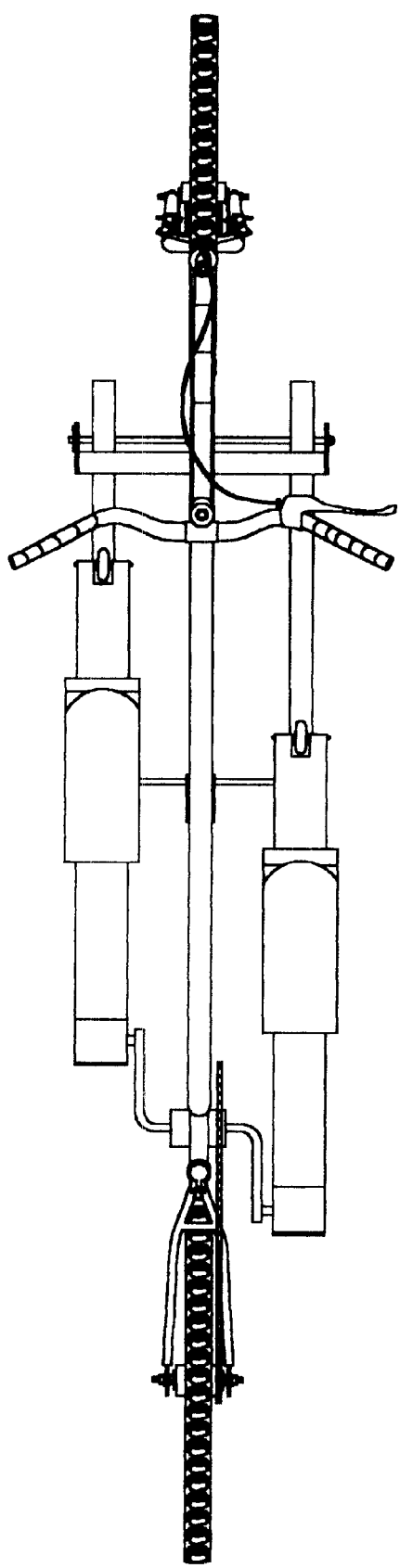
FIG. 2 is a top elevational view of the standing bicycle shown in FIG. 1
Figure 3:
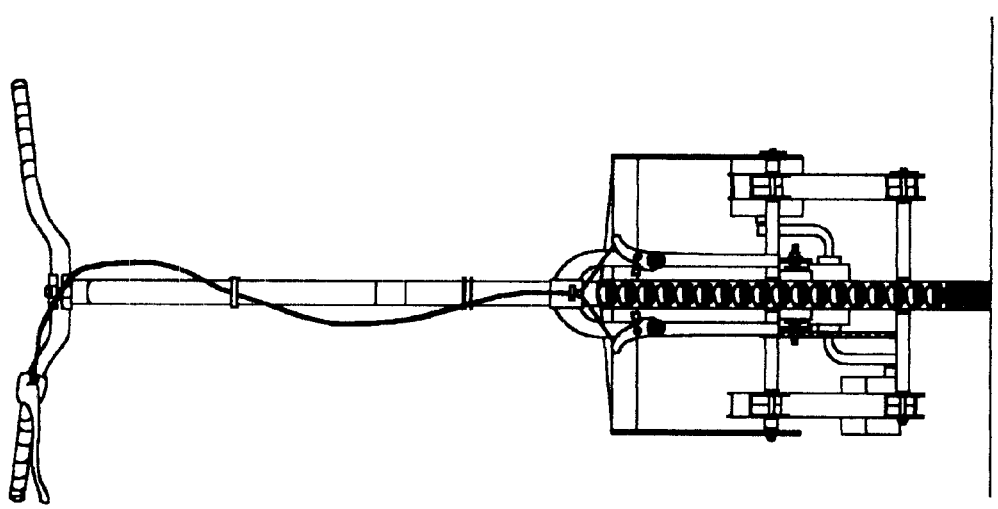
FIG. 3 is a front elevational view of the standing bicycle shown in FIGS. 1 and 2
Figure 4:
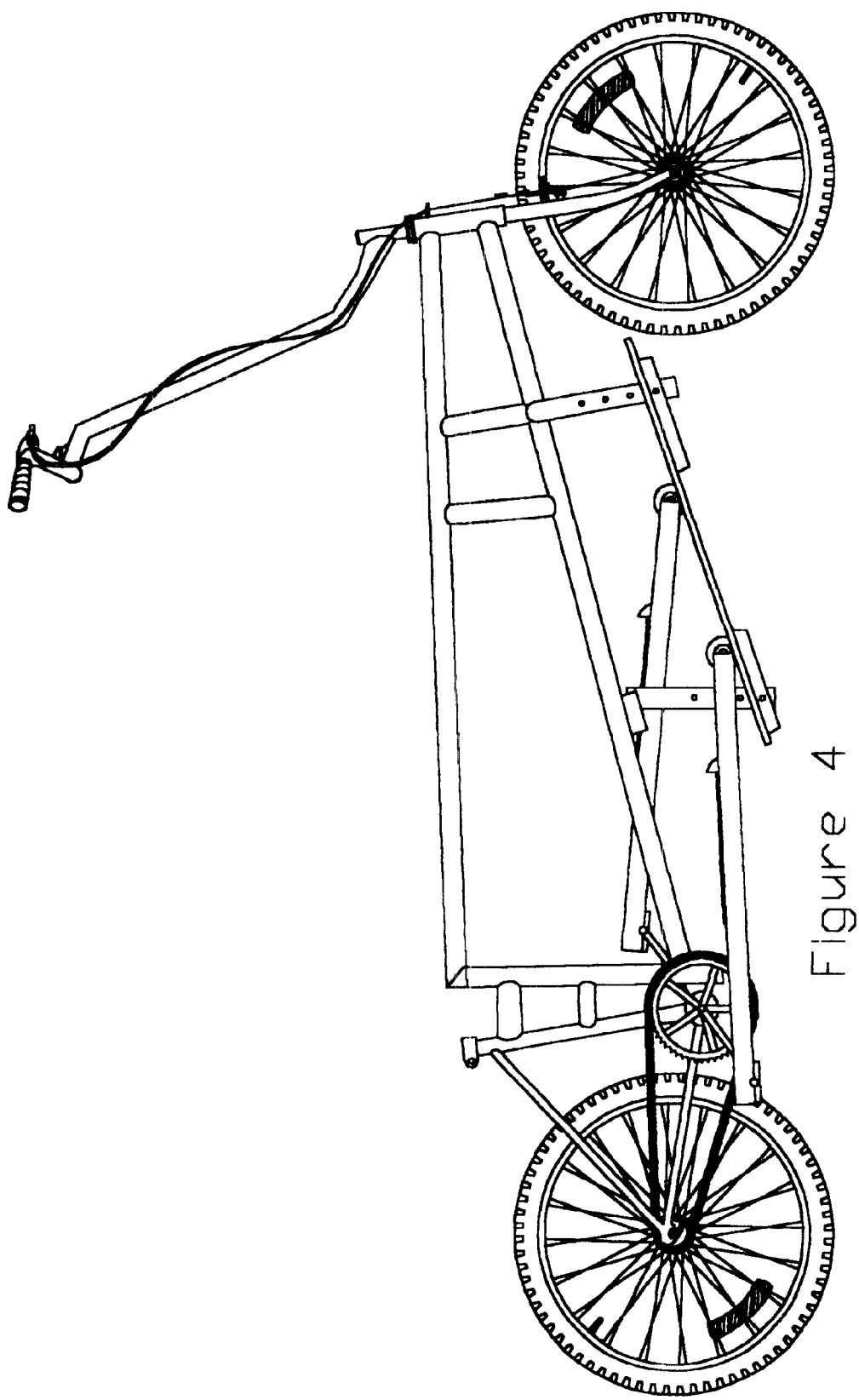
FIG. 4 is a right elevational view of the standing bicycle shown in FIGS. 1–3
Figure 5:
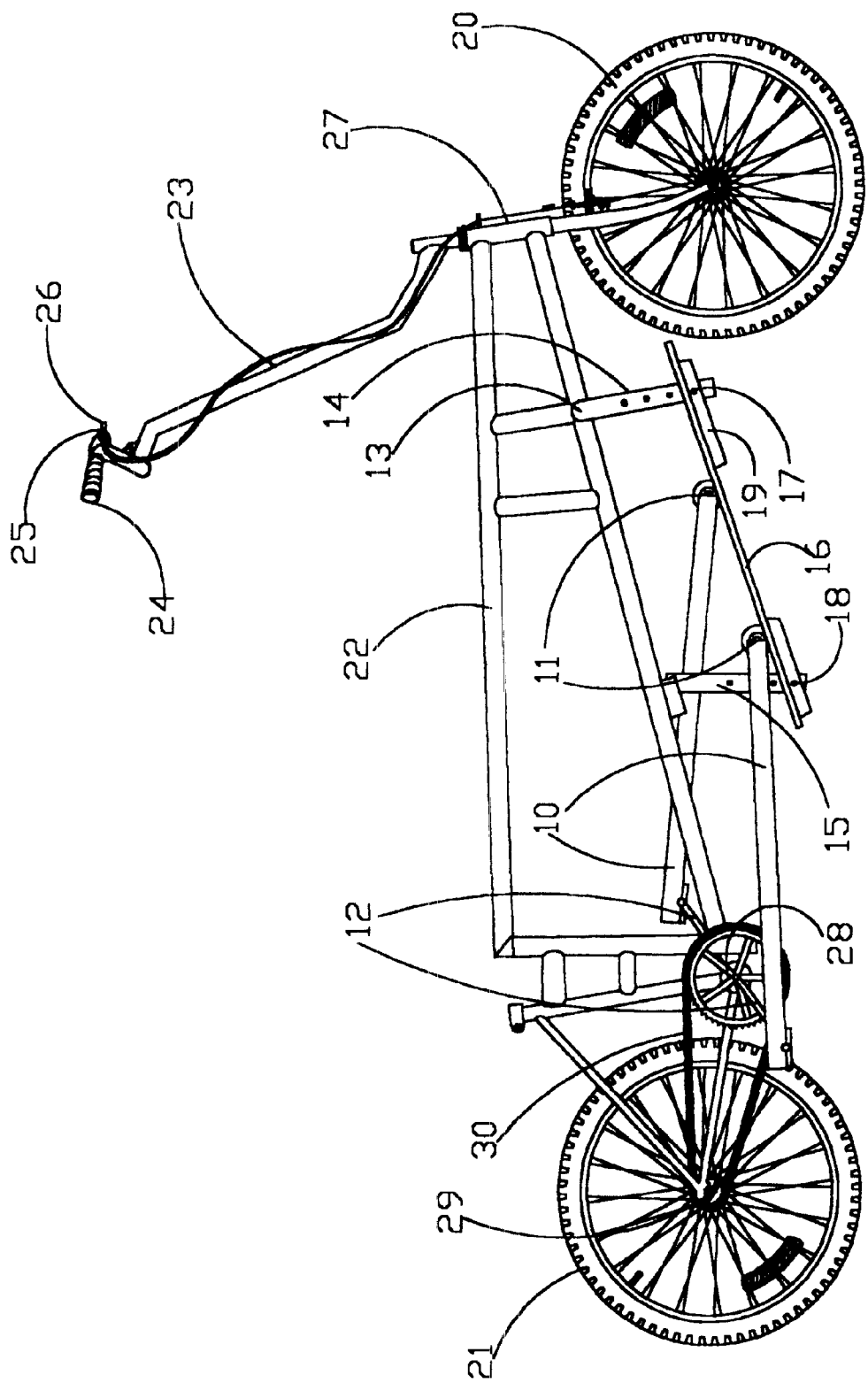
FIG. 5 is a right elevational view and pertains to the description of the preferred embodiment

10. Horizontal Foot Support Members
11. Foot Support Member Wheels
12. Crank Arms
13. Cross-member
14. Front Vertical Support Members
15. Rear Vertical Support Member
16. Guide Track
17. Front Cross-pin
18. Rear Cross-pin
19. L-Brackets
20. Front Tire
21. Rear Tire
22. Bicycle Frame
23. Steering Column
24. Handle-Bar
25. Derailleur
26. Brake Lever
27. Bicycle Steering Neck
28. Front Pinion
29. Rear Pinion
30. Linked Chain

DESCRIPTION OF THE PREFERRED EMBODIMENT

For the purposes of promoting an understanding of the principles of the invention, reference will now be made to the embodiment illustrated in the drawings and specific language will be used to describe the same. It will never-the-less be understood that no limitation of the scope of the invention is thereby intended.

The present invention contemplates a standing bicycle 50 with elliptical motion pedalling as depicted in FIGS. 1–6. The bicycle 50 includes two horizontal foot support members 10 on which the operator stands. The foot support members, which are made of a rigid material, may be widened at the foot placement location and can include straps or slots to ensure proper footing. One end of the foot support members is connected to the revolving crank arm ends 12. Two bearings, recessed within the foot support members and held in place by a washer and nut, provide rotational freedom of motion to the foot support members. A small wheel 11 is attached to the frontal section of the foot support member 10 by way of a fixed axle. The wheel 11, and bearings, are then mounted to the axle, allowing frictionless linear motion of the foot support members 10 along the guide tracks 16. The single wheel 11 may be replaced by a double wheeled system in order to ensure that the foot support member 10 does not become disengaged from the guide-track assembly 16. The sliding mechanism could further be improved by removing the guide track 16 and wheel system 10 altogether, and replacing it with a shaft and sliding sleeve mechanism or similar design. This would decrease the overall vehicle weight and improve the mechanisms performance.

Figure 6:
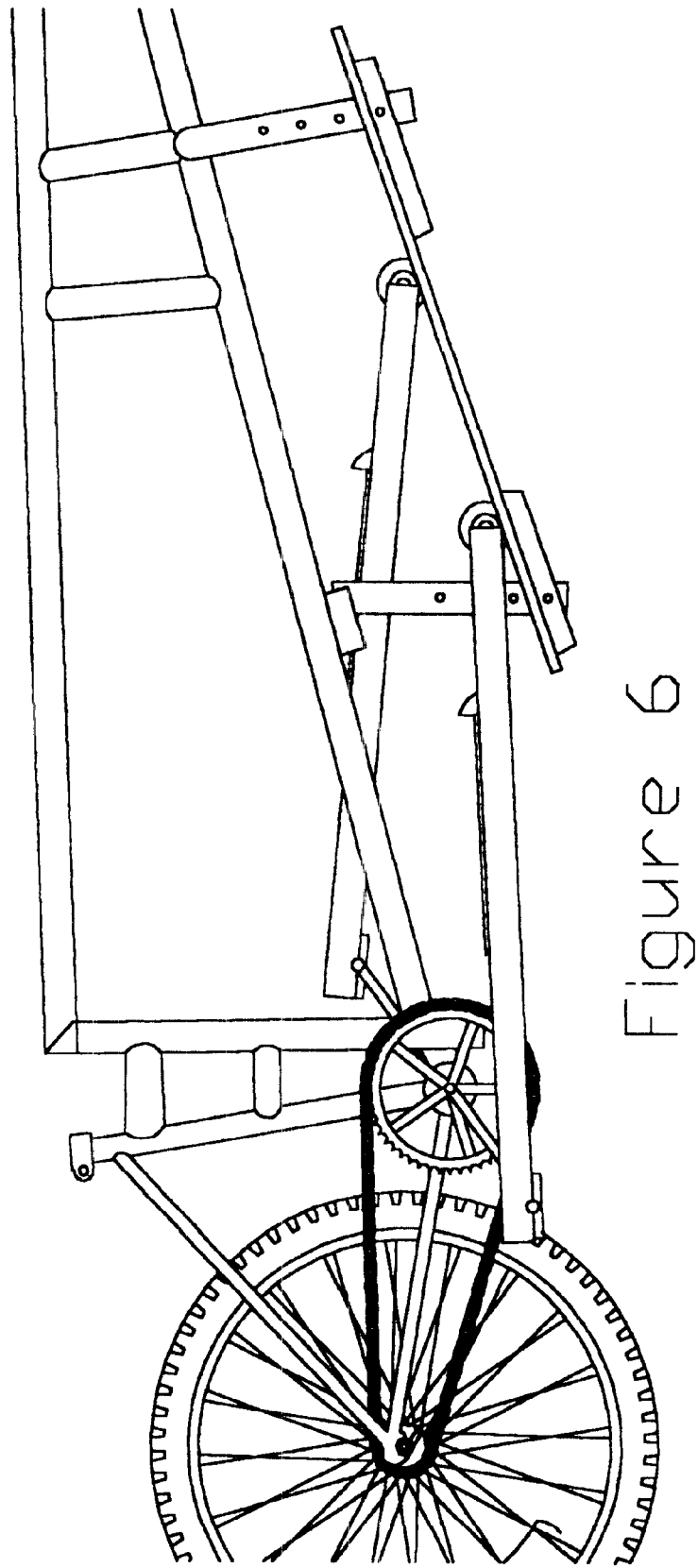
FIG. 6 is an enlarged view of the track and skis depicted in FIGS. 1–4

FIG. 6 is a detailed depiction of the horizontal foot support member 10 hardware and assembly. The foot support member 10, slides up and down along the straight guide track 16 as the cyclist pedals the bicycle. The movement is similar to that of a slider-crank mechanism with the slider set at an angle. The stepping motion may resemble cross country skiing at lower guide track angles, and may simulate walking, jogging, running and climbing at higher guide track inclination angles.

The two guide tracks 16, are mounted at the frontal section, to three vertical support members 14, and to a single swiveling vertical support member 15 at the rear location. To fasten the guide track to the vertical support members, solid, stainless steel, horizontal cross-pins of one-half inch diameter 17 and 18 are used. The cross-pins 17 and 18 are secured at one end by a removable pressure pin and at the other end by a welded stopper. L-brackets 19 are welded to the underside of the guide tracks 16, forming a u-shaped channel which support a slot through which the cross-pins may be inserted. The cross-pins 17 and 18 are then used to fasten the guide tracks 16 to the vertical support members 14. Consecutive holes positioned sequentially along the vertical support members 14, allow the guide tracks 16 to be readjusted to the desired inclination angle. The guide tracks 16 are maintained in proper alignment with the foot support member wheels, by spacers, which are positioned appropriately along the length of the cross-pins. These spacers can be made of PVC or similar lightweight tubing. The track angle can be adjusted in the present invention by removing the front cross-pin 17, repositioning the guide track 16 to the desired angle, and replacing the cross-pin to the corresponding location. This mechanism could possibly be replaced by a rack and pinion, or similar device, positioned vertically, in order to raise and lower the front portion of the track. The mechanism could be controlled by the rider, electrically or manually, and could facilitate adjustment of the track angle.

In the present invention it is necessary to dismount the vehicle before adjusting the guide tracks. An improved design contemplates a mechanism which may be operated by the rider from the riding position, thereby allowing guide-track repositioning to take place while the vehicle is in motion.

The bicycle is powered by the rear tire 21, as in an ordinary bicycle. Rotational motion is translated from the pedal and crank system 28 to the rear tire 21 by way of a linked chain 30, and a system of variably sized sprockets 29. Using the derailleur lever 26, the rider may selectively choose from a variety of speed to power ratios, as is well known in the art. The rotatable steering column 23, may be positionally adjustable to accommodate riders of various heights and position preferences. The handle-bars 24, which are fixed perpendicularly to the steering column 23, provide an accessible location on which to place the front and rear brake levers 25 and the front and rear derailleur shift levers 26. Both being actuated by way of braided steel cables enclosed in flexible housings, identical to those used in standard bicycles for similar purposes.

The vehicle may also include a seat or resting element mounted to the frame 22. An elongated bicycle seat, commonly known as a banana seat, may serve as a surface on which the rider may rest during periods of inactivity. Alternately, a leaning pad could be used to alleviate the intensity of the work-out, by providing a resting element against which the occupant may lean. The seat would allow further adjustability of exercising intensity. As a result, the bicycle may be ridden in a leaning or even seated position, while still maintaining a generally upright stance. This may be preferred by riders of lesser physical ability. The seat may also be completely removable without infringing on the original intention of the invention.

What is claimed is:

1. An occupant propellable land vehicle comprising;

a frame having two wheels rotably mounted thereto for enabling said frame to roll along a surface;

a crank means rotatably connected to said frame, said crank means projecting outwardly therefrom on both sides thereof;

a pair of non-aligned foot support members, each said non-aligned foot support member having a first end and a second end, said first end operably associated with said crank means, such that said second end Of said non-aligned foot support member follows a general back and forth movement as said crank means are rotated;

a pair of guide tracks attached to said frame, said guide tracks providing a frictionless surface on which said second end of foot support members may slide back and forth as said crank means are rotated;

a plurality of vertical support members, said vertical support members operably associated with said guide tracks and said frame such that a frontal portion of said guide track may be vertically adjustable in position and thereby, inclination angle;

a handlebar rotatably coupled to a front wheel for the purpose of steering the vehicle.

2. A vehicle as described in claim 1 wherein said guide track inclination angle may be adjusted positionally.

3. A vehicle as described in claim 2 having at least one brake actuating means attached to said handle-bar, and a braking device attached to at least one of said wheels, for the purpose of retarding the motion of said vehicle.

\* \* \* \* \*